April 28, 1925.
G. A. MADDOX
CONTAINER CLOSURE AND CAP REMOVER
Filed April 17, 1924
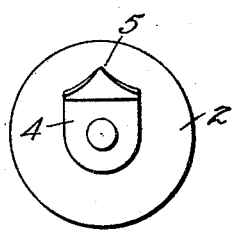
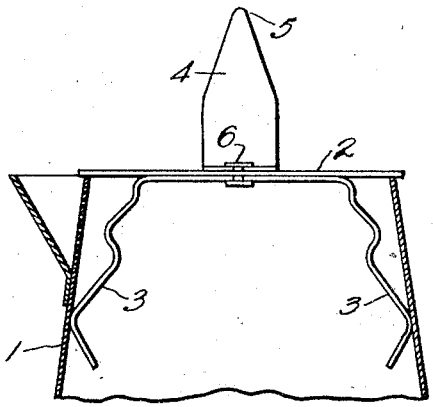
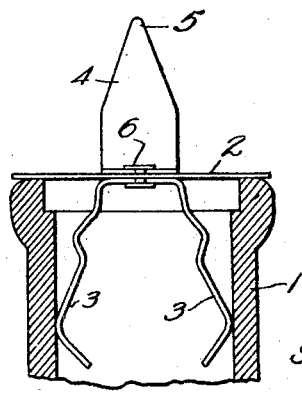
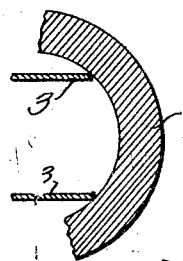
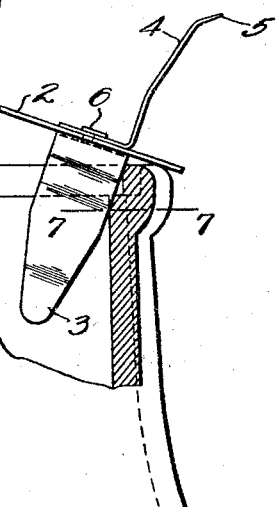
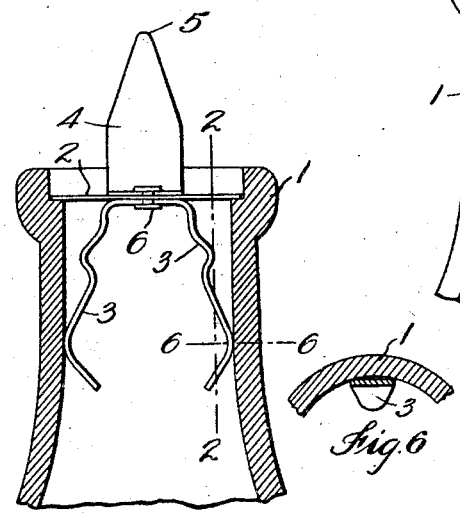
Inventor:
Gustavus A. Maddox
By William W. Varney
Attorney.

Patented Apr. 28, 1925.

1,535,488

UNITED STATES PATENT OFFICE.

GUSTAVUS A. MADDOX, OF BALTIMORE, MARYLAND, ASSIGNOR OF ONE-HALF TO ROBERT F. LEACH, JR., OF BALTIMORE, MARYLAND.

CONTAINER CLOSURE AND CAP REMOVER.

Application filed April 17, 1924. Serial No. 707,030.

*To all whom it may concern:*

Be it known that I, GUSTAVUS A. MADDOX, a citizen of the United States, and a resident of Baltimore city, in the State of Maryland, have invented a new and useful Container Closure and Cap Remover, of which the following is a specification.

The object of my invention is the providing an improved container closure having means of maintaining the same in position and so constructed that the same may be used in a partially open position, as desired.

With the foregoing and other objects in view, my invention consists of the novel construction, combination and arrangement of parts as hereinafter specifically described and illustrated in the accompanying drawing, wherein is shown the preferred embodiment of my invention, but it is understood that changes, variations and modifications can be resorted to which come within the scope of the claims hereunto appended.

In the drawing of the herein-described embodiment of my invention Fig. 1 is a view in elevation of my improved closure and cap remover as applied to an ordinary standard milk bottle. Fig. 2 is a view in elevation of my closure and cap remover taken at right angles to the view shown in Fig. 1 on 2—2, as applied to a standard milk bottle in the open position, as I call it, or position for pouring from said bottle. Fig. 3 is a modified form of the closure and cap remover in elevation as applied to a standard milk bottle seating on the top of the same. Fig. 4 is a modified form of the closure as applied to a coffee pot, mug, or other container. Fig. 5 is a plan view of the container shown in Fig. 1. Fig. 6 is a sectional view taken through 6—6 of Fig. 1, showing the double contact of the flat spring. Fig. 7 is a view taken through 7—7 of Fig. 2, showing the contact of the spring when the cap is in partially open position.

Similar numerals refer to similar parts throughout the several views.

1 is a container and may consist of a standard milk bottle, coffee pot, can, mug, or other vessel. 2 is the disc. 3 is a flat spring member. In the drawings, both spring members are shown flat and consequently marked 3. In practice, however, only one of said members is necessarily flat; the other may be, under certain circumstances, round or other shape not shown. 4 is a flat projecting member provided with bent and sharpened point 5. The various members may be secured together by a rivet 6, or welded, soldered, or made integral, as desired.

I have discovered that a flat spring member introduced within a container and contacting on its edges somewhat separated, provides an improved containing means for holding the disc and as the same is withdrawn from the container and tilted into a position shown in Fig. 2 this double contacting of the flat spring adds greatly to the rigidity of the closure, and when the flat spring near the disc contacts with the container forms a three-point contact. This, I have found, gives a very satisfactory closure and will remain in open position without being held by external means.

In this specification and claims, when I use the term "disc," I mean a cap, disc, or other covering element not necessarily round or flat.

Having thus described my invention, what I claim and desire to secure by Letters Patent is:

1. A container closure, comprising a disc and a plurality of members, one of which is resilient, secured to said disc to project within and engage the interior wall of a container to be closed, the engagement between one of said members and the interior wall being a two point engagement whereby friction is produced between at least one of said two points and the interior wall of the container when said disc is moved in a direction at right angles to a plane passing through two of said members.

2. A container closure, comprising a disc and a plurality of resilient members secured to said disc to project within and engage the interior wall of a container to be closed, the engagement between said members and the interior wall being a two point engagement of each member whereby friction is produced between one of said points of contact and the interior wall of the container when said disc is moved.

3. A container closure, comprising a disc and a plurality of members, one of which is resilient, secured to said disc to project within and engage the interior wall of a container to be closed, the engagement between one of said members and the interior wall being a two point engagement whereby friction is produced between at least one of said two points and the interior wall of the container when said disc is moved in a direction at right angles to a plane passing through two of said members and a projection on said disc exterior of the container when closed by said disc forming a handle to facilitate the transverse movement thereof.

GUSTAVUS A. MADDOX.

Witnesses:
RICHARD P. HUTCHINS,
EDWARD P. REYNOLDS.